Sept. 19, 1961  W. H. FOUSE ET AL  3,000,140
AUTOMATIC WEIGHT REGULATOR FOR GLASS MACHINES
Filed July 1, 1957  8 Sheets-Sheet 8
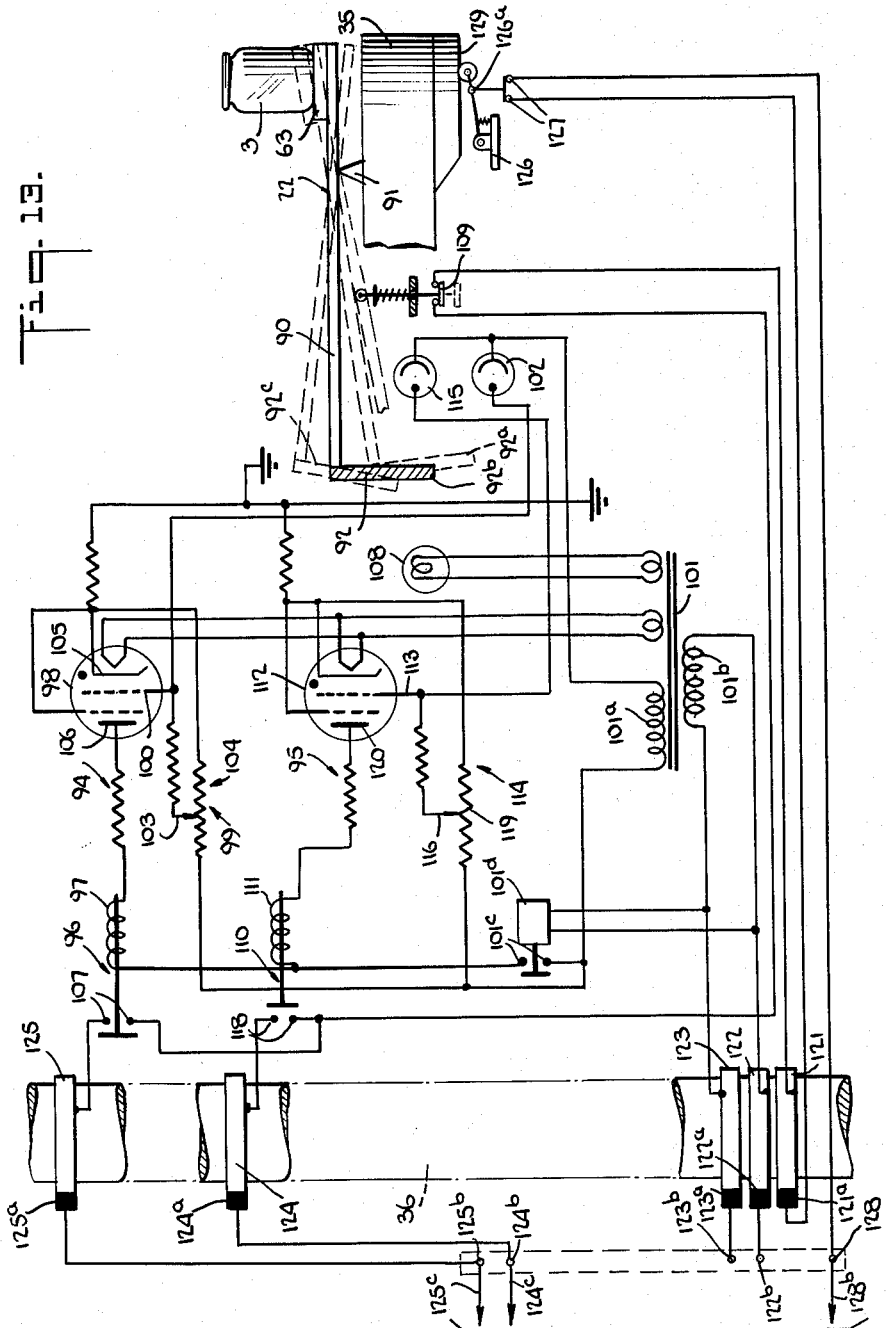
INVENTORS
WILLIAM H. FOUSE
FREDERICK Z. FOUSE
BY
Norman N. Holland
ATTORNEY United States Patent Office 3,000,140
Patented Sept. 19, 1961

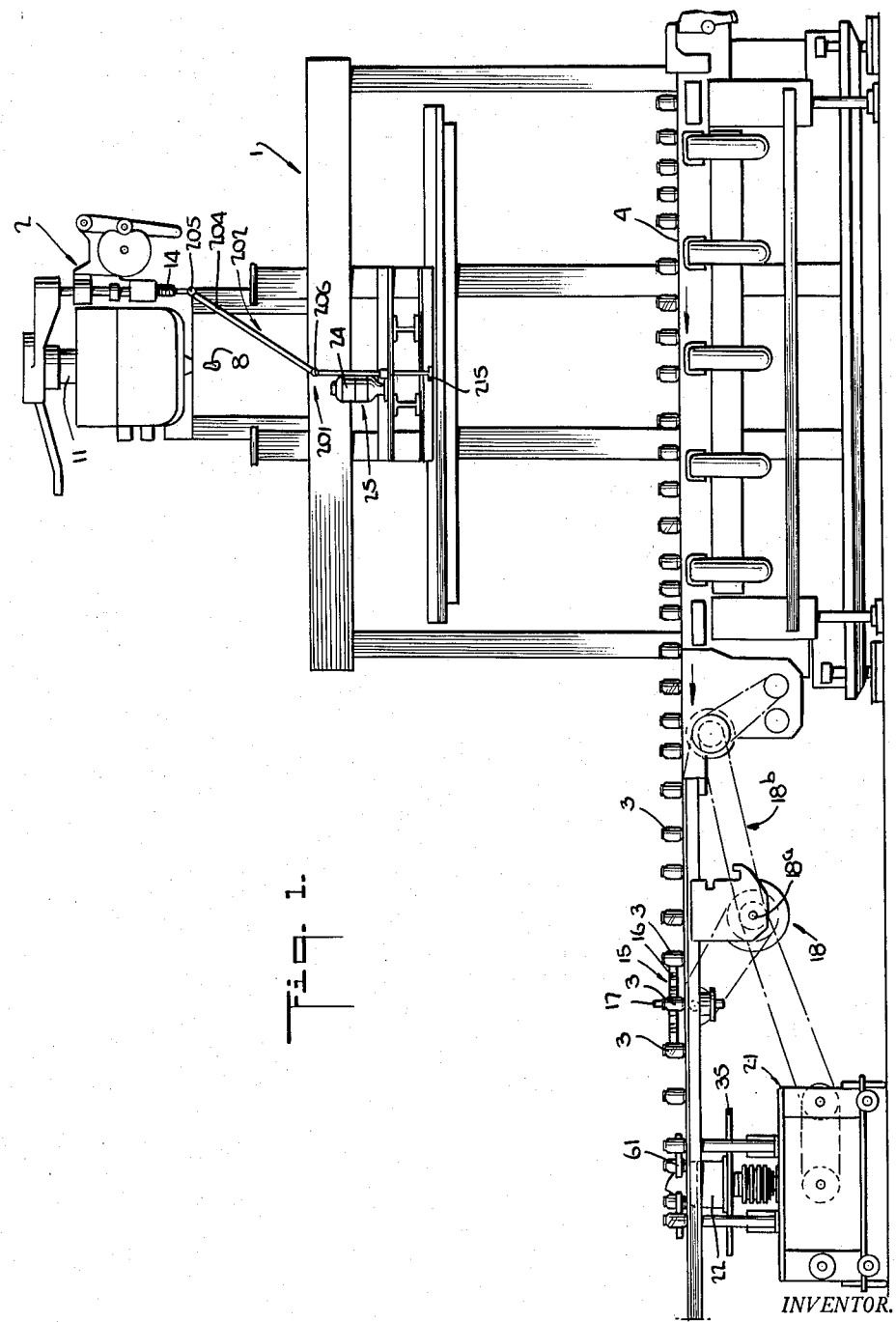

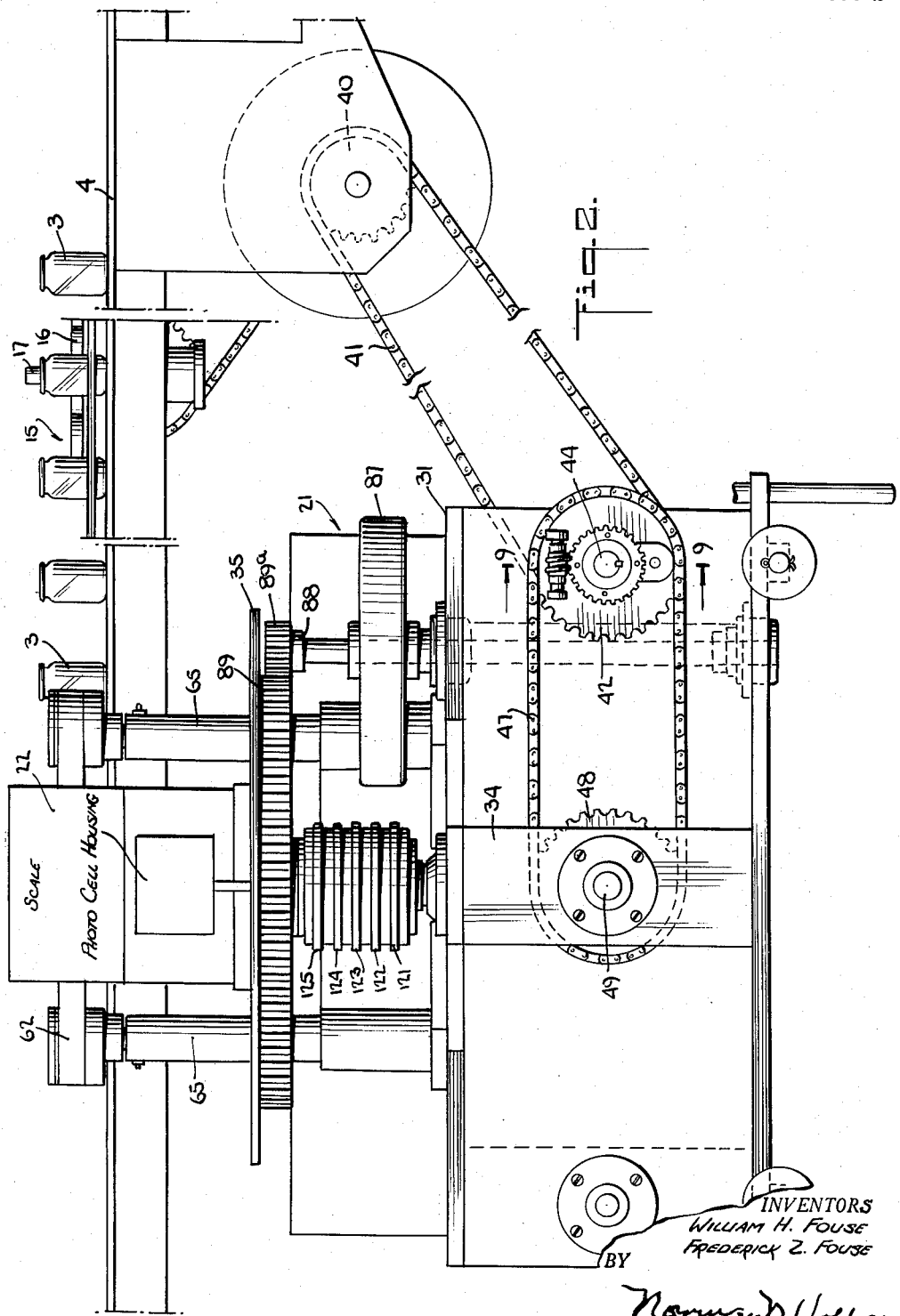

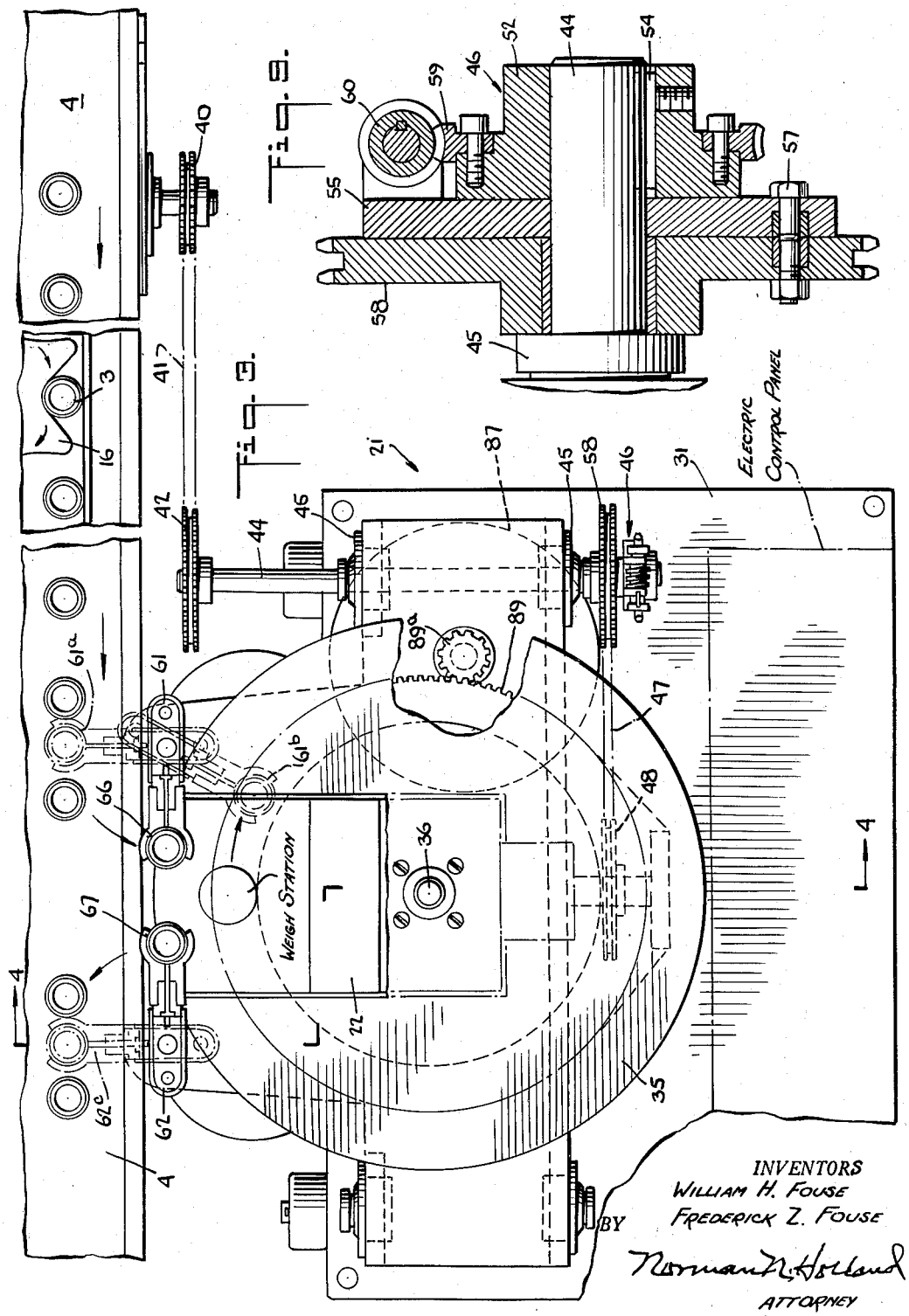

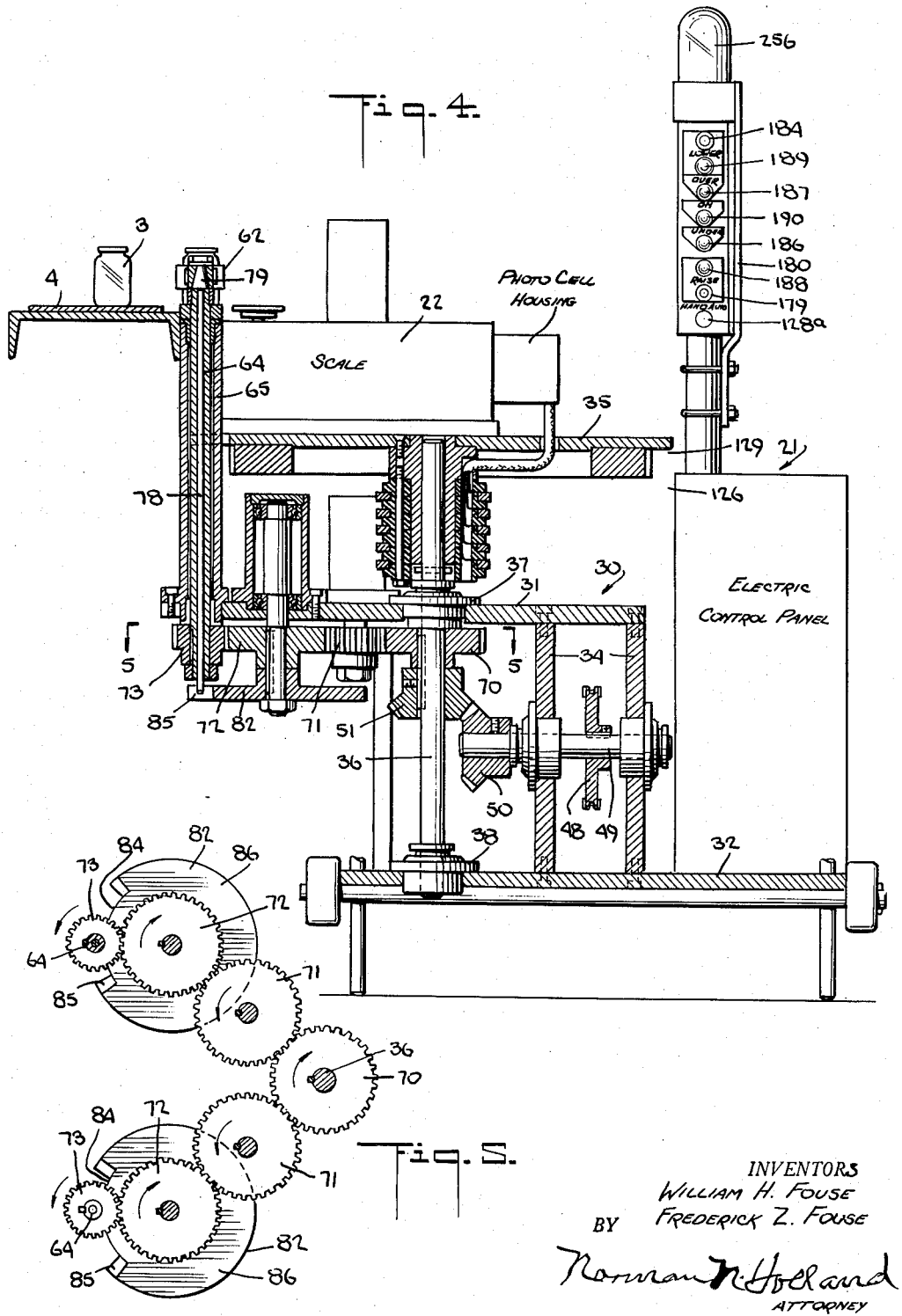

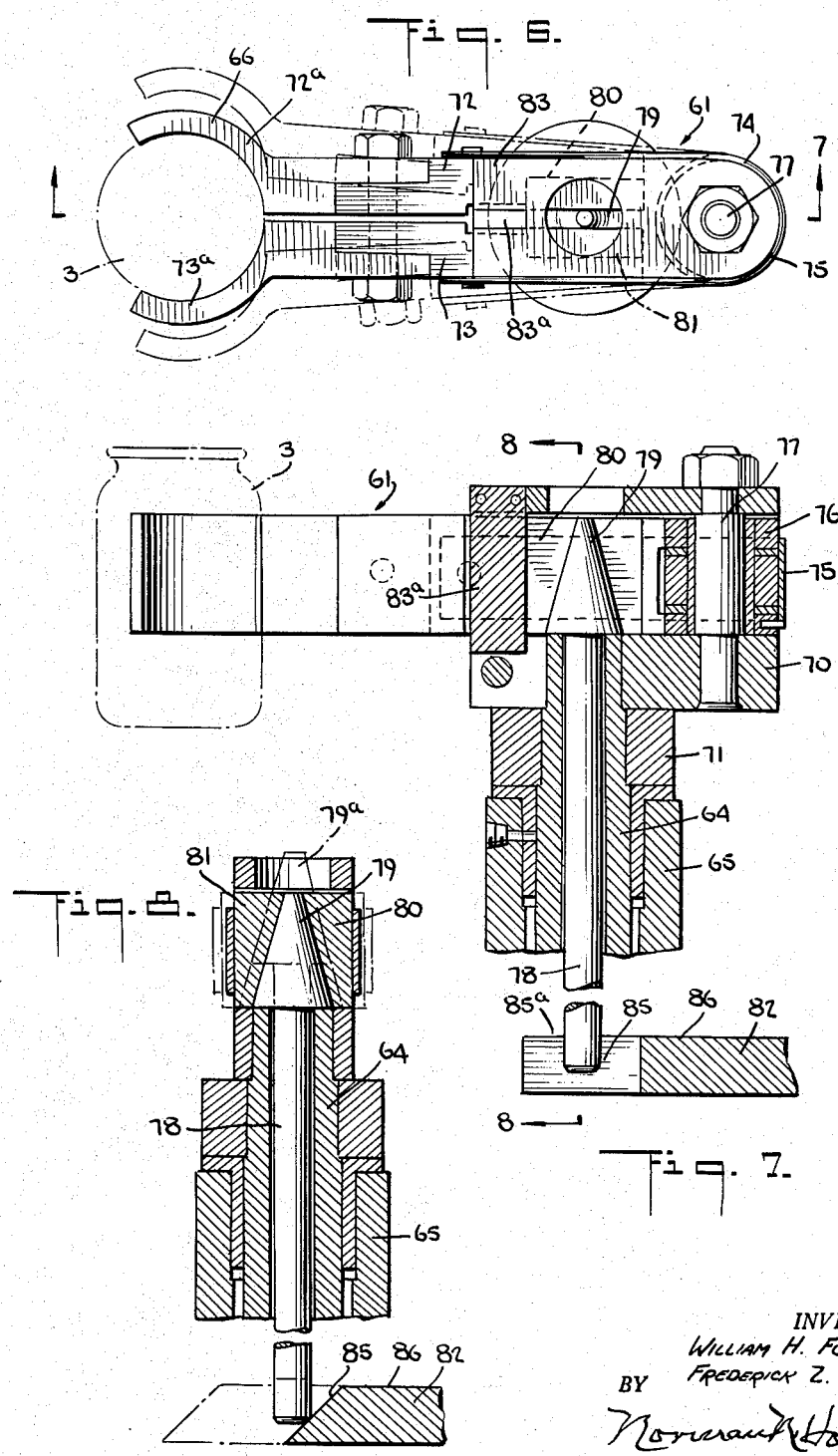

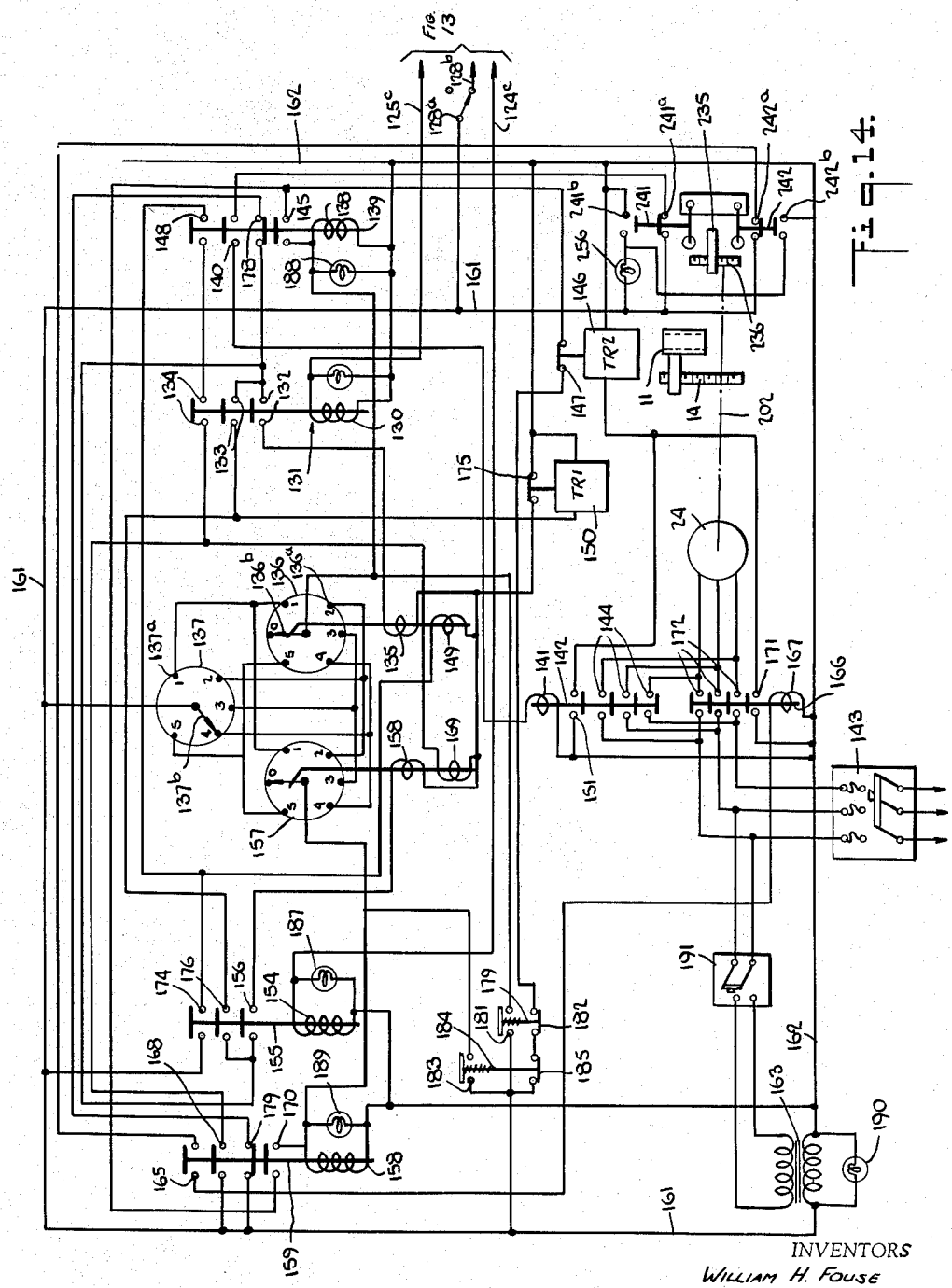

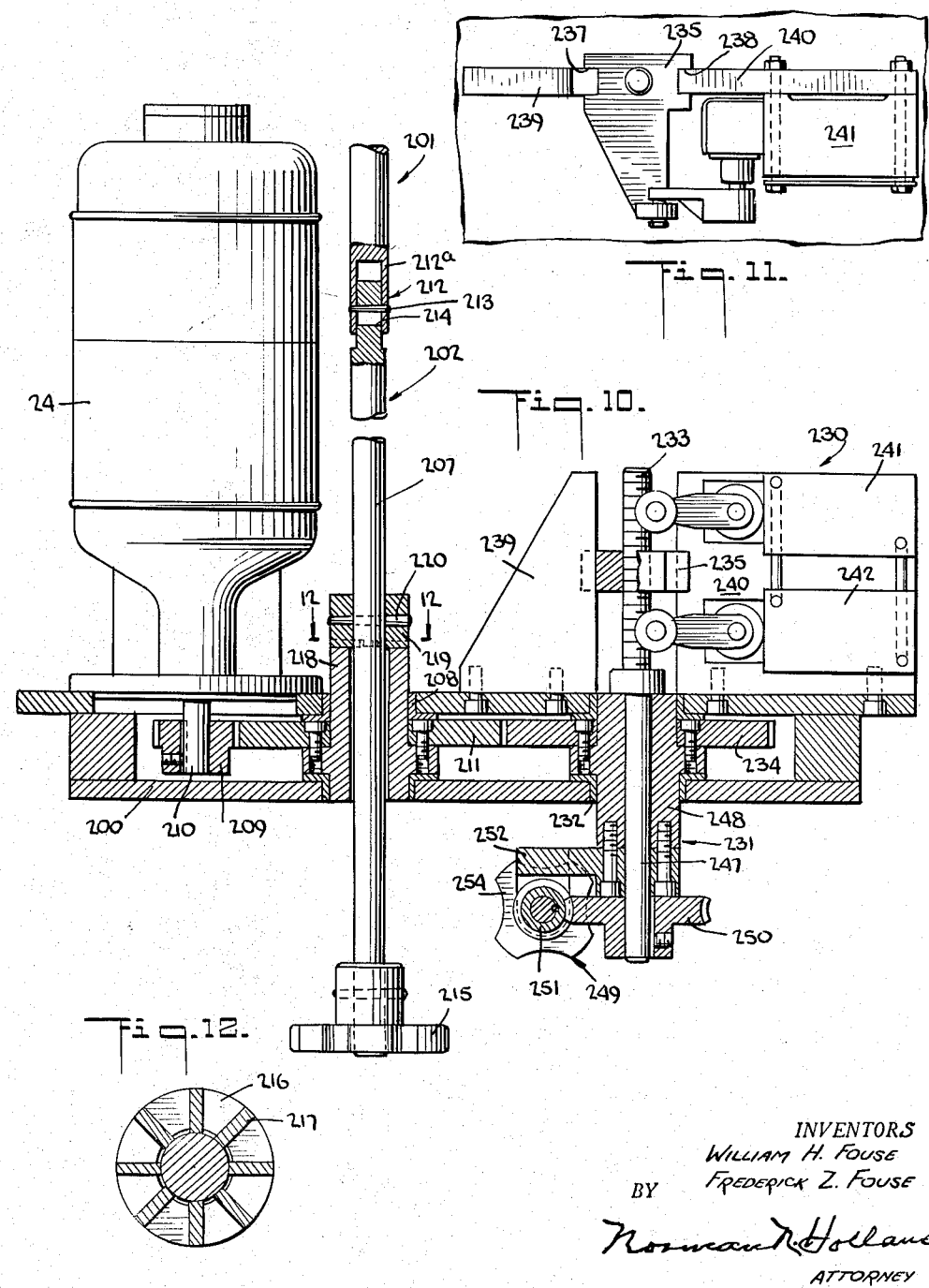

3,000,140
AUTOMATIC WEIGHT REGULATOR FOR GLASS MACHINES
William H. Fouse and Frederick Z. Fouse, Lancaster, Ohio, assignors to Anchor Hocking Glass Corporation, Lancaster, Ohio, a corporation of Delaware
Filed July 1, 1957, Ser. No. 669,318
8 Claims. (Cl. 49—5)

The present invention relates to the manufacture of glass articles and more particularly to means for automatically controlling the weight of the articles manufactured.

In order to provide glass articles such as glass containers or utensils or other similar articles at minimum costs, these articles are presently manufactured on high-speed automatic machinery which produces these articles at rates up to or about 100 articles per minute. The articles are automatically carried through the complete manufacturing cycle from the molten glass supply to the finished annealed glass product. Many of these automatic glass manufacturing machines begin the forming process by transferring a charge of molten glass of predetermined volume from a glass feeder to the molding or other glass shaping machine. In these molding machines, the complete glass charge is used in forming the finished glass product. It is therefore important that the glass charge be of a constant and predetermined volume so that the finished glass articles have a constant weight, shape, and volume.

This control of the glass charge is particularly important in the manufacture of glass containers. Modern glass containers are designed with sealing surfaces of predetermined shape so that the containers may be hermetically sealed at high rates of speed on automatic sealing machines. Undersize glass charges in the container forming machinery result in unfilled finishes and thin walls which are too fragile, and oversize charges result in under-capacity containers and excessive wear on mold equipment.

The automatic weight regulator of the present invention is an improvement upon that shown in United States Patent No. 2,306,789 issued on December 29, 1942, to W. L. McNamara and which is assigned to the assignee of the present invention. The regulator of the present invention is adapted for use with a wider variety of article forming machines and is particularly adapted for use with machines which handle the finished articles on high-speed conveyor belts or similar means. The improved regulator of the present invention is adapted to sense and correct significant and consistent variations in the weights of the formed articles and to be insensitive to random and irregular variations.

Accordingly, it is an object of the present invention to provide an improved means for automatically controlling the weight of glass articles made on automatic glass machines, including the most modern high-speed machines.

Another object of the present invention is to provide means for automatic weight control which is adaptable for use on a wide variety of glass forming machines.

Another object of the present invention is to provide a reliable and relatively simple means for controlling the finished weight of glass articles formed on high-speed automatic machinery.

Another object of the present invention is to provide an improved means of checking the article weights of a continuous output of glass articles from a forming machine by automatic and periodic sampling of the individual article weights.

Another object of the present invention is to provide an improved means of automatically regulating the weight of glass articles made on a continuously operating forming machine which is sensitive to continuing errors in article weights and which is insensitive to random or irregular variations in article weight.

Other and futher objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a front elevational view of the automatic weight control of the present invention on a machine for forming glass articles;

FIG. 2 is a front elevational view of the automatic weighing machine of the present invention;

FIG. 3 is a top plan view of the automatic weighing machine of FIG. 2;

FIG. 4 is a sectional view of the automatic weighing machine taken along line 4—4 of FIG. 3;

FIG. 5 is a sectional view taken along the line 5—5 of FIG. 4;

FIG. 6 is an enlarged top plan view of a pick-off arm of the automatic weigher;

FIG. 7 is a sectional view of the pick-off arm taken along line 7—7 of FIG. 6;

FIG. 8 is a sectional view of the pick-off arm taken along the line 8—8 of FIG. 7;

FIG. 9 is an enlarged sectional view of the synchronizing adjustor taken along line 9—9 of FIG. 2;

FIG. 10 is an enlarged front elevational view of the regulator drive system;

FIG. 11 is a top plan view of the limit switches of the regulator drive system;

FIG. 12 is a sectional view taken along line 12—12 of FIG. 10;

FIG. 13 is a schematic wiring diagram of the scale; and

FIG. 14 is a schematic wiring diagram of the automatic regulator control circuit.

FIG. 1 illustrates the automatic weight regulator of the present invention combined with an automatic glass container forming machine 1. The container forming machine 1 may be any of the commercially known types such as the individual section machines commonly known as IS machines manufactured by the Emhart Manufacturing Co. of Hartford, Connecticut. The forming machine 1 is continuously fed discrete charges of molten glass from a glass feeder 2, and the glass charges are shaped into glass articles such as containers 3 which are delivered continuously from the forming machine 1 to a conveyor 4 for transmission to other article-treating apparatus such as annealing ovens. Such forming machines are well known and further description is therefore unnecessary.

The glass feeder 2, which periodically feeds a charge of glass 8 of predetermined volume to the container forming machine 1, may be one of the several known types of glass feeders. Since no claims are being made to the glass feeder 2 per se and as the glass feeder 2 is intended to represent glass feeders generally, the feeder will not be described in detail herein. One suitable feeder is illustrated in the above-mentioned McNamara Patent No. 2,306,789. The known types of glass feeders each have a movable control member whose position controls the size of the charge 8 fed to the forming machine 1. This control member is indicated for purposes of the present description as a sleeve 11 whose position and hence the size of charge 8 are adjusted by the threadedly connected rotatable shaft 14. Rotation of the shaft 14 in one direction moves the sleeve 11 to increase the charge size and rotation of the shaft 14 in the opposite direction decreases the charge size.

As will be more fully described below, the shaft 14 is driven in the appropriate direction by the automatic control circuit to correct the size of the glass charges 8 so that the charge 8 is the correct size for the particular container being formed in the container forming machine 1.

The containers 3 formed in the forming machine 1 are deposited at intervals on a conveyor 4 and are spaced at exact intervals by a spotter 15.

Any of the known types of spotters may be used, such as a rotating star wheel. These star wheels are in common use for positioning containers on predetermined positions on moving conveyors. A star wheel 16 rotatably mounted on a vertical shaft 17 is illustrated in FIG. 1 in a position intermediate the container froming machine 1 and the automatic weighing machine 21. The shaft 17 is operatively connected to and driven by the drive mcehanism of the conveyor 4 by a suitable drive means indicated at 18, which includes a spotter drive shaft 18a which is driven from the conveyor 4 through a suitable drive connection indicated at 18b. The drive connection between the conveyor drive mechanism and the star wheel 16 comprises positive coupling means such as sprockets, chains, and gears so that the movement of the star wheel 16 can be adjusted and maintained in synchronism with the conveyor 4. This permits the star wheel 16 to position the containers 3 in predetermined positions on the conveyor 4. Since the automatic weighing machine 21 is also driven from the spotter drive shaft 18a by a positive drive connection, the star wheel 16 may also be adjusted and maintained in synchronism with the moving portions of the automatic weighing machine 21.

The containers 3 after being spaced equally by the spotter 15 on conveyor 4 are carried past an automatic weighing machine 21. As will be more fully explained below, the automatic weighing machine 21 removes a container 3 from the conveyor 4 periodically, such as, for example, every twelfth container, and weighs it on a scale 22 to determine whether the container is a predetermined weight or overweight or underweight. Since the density of the glass being used to form a particular object is substantially constant, the weight of the articles formed may be used as a satisfactory indication of the volume of the finished article. The weight range corresponding to a perfect article is determined and those articles which have greater or lesser weights, so that they are outside the desired range, are therefore either oversize or undersize.

Overweight and underweight containers are registered by an automatic control circuit and when a predetermined consecutive number of overweight or underweight containers are registered, the automatic regulator control circuit energizes a regulator motor 24 of the regulator drive system 25 to turn the control tube 11 positioning shaft 14 in the appropriate direction to increase and decrease the size of the glass charge 8. As each twelfth container is picked off the conveyor 4 by the automatic weighing machine 21, the space left on the conveyor is filled by the return of the previously weighed container 3 in its place. The conveyor 4 carries the containers 3 from the automatic weighing machine to a suitable annealing furnace or other container treating or handling means.

The automatic weighing machine

The automatic weighing machine 21 is illustrated in detail in FIGS. 2–4. The machine comprises a frame 30 with a top plate 31 supported on a base plate 32 by vertical support members 34. A scale turntable 35 is rotatably mounted on a vertical shaft 36 on suitable bearings 37 and 38 in the top plate 31 and the base plate 32, respectively. The scale turntable supports the scale 22, and it is continuously rotated by a turntable drive means in synchronism with spotter 15 and conveyor 4.

The turntable drive means includes sprocket 40 on the spotter drive shaft 18a which is connected by chain 41 to a sprocket 42 (FIG. 3) on synchronizing shaft 44 on frame 30. The synchronzing shaft 44 is mounted in suitable bearings 45 in support members 34, and it has a synchronizer sprocket 46 mounted thereon which drives the turntable 35 through the intermediation of chain 47, sprocket 48, shaft 49, and bevel gears 50 and 51. The synchronizing sprocket 46 allows for the synchronization of the scale turntable 35 and its associated pick-off means with the spotter 15. The turntable 35 and spotter 15 are both positively driven from the spotter drive shaft 18a, so that they will maintain constant relative positions. The synchronizing sprocket 46 permits the relative positions of the turntable 35 of the automatic weigher mechanism and the spotter 15 to be adjusted. The synchronizing sprocket 46 is illustrated in detail in FIG. 9, and it comprises a fixed hub 52 splined at 54 to the synchronizing shaft 44 and a connector plate 55 having an adjustable connection 56 with fixed hub 52 and a fixed connection 57 with a sprocket 58 which is also mounted on shaft 44. The adjustable connection 56 comprises a ring gear 59 mounted on the hub 52 which is engaged by worm 60 rotatably mounted on the connector plate 55. Rotation of the worm 60 changes the relative radial positions of the hub 52 and the sprocket 58 on the synchronizing shaft 44 so that the relative positions of the automatic weigher turntable 35 and the spotter 15 are simultaneously adjusted.

In order to provide for the smooth transfer of every twelfth container 3 from the conveyor 4 to the scale 22 and vice versa, the scale 22 is mounted on the scale turntable 35 with its weighing platform 63 positioned at such a radius that its center travels a circular path whose circumference is equal to the distance between twelve containers on the conveyor 4, and the drive connection for the scale turntable 35 is arranged to move the center of the weighing platform 63 at the speed of the conveyor 4. The operation of the scale 22 will be more fully described below.

The pick-off means which moves the containers between the moving conveyor 4 and the moving weighing platform 63 comprises two rotating arms 61 and 62. Each of the arms is mounted on a drive shaft 64 (FIG. 4) which is rotatably mounted in a fixed bushing 65 fastened to the edge of the frame top plate 31. The arm drive shafts 64 are rotated so that the jaws 66 and 67 at the ends of the arms 61 and 62 will move at the speed of conveyor 4. The radius of the center of the jaws 66 and 67 on the arms 61 and 62 is preferably one-half the distance between the centers of the weighing platform 63 and the turntable 35, so that two complete revolutions of the jaws are made for each rotation of the turntable 35. On one revolution, the jaws 66 are closed by a cam means which will be described below so that arm 61 moves one container 3 from the conveyor 4 to the weighing platform 63 while the jaws 67 of arm 62 simultaneously move the previously weighed container 3 from the weighing platform to the space on conveyor 4 left by the simultaneous removal of the container 3 by arm 61.

The drive shafts 64 for the arms 61 and 62 are driven from the vertical turntable shaft 36 through the intermediation of the gear trains 70, 71, 72, and 73 (FIGS. 4 and 5).

During a portion of every other revolution of the arms 61 and 62 on shafts 64, the jaws 66 and 67 are closed on a container 3 to move it between the conveyor 4 and the scale 22 or vice versa. The jaw control mechanism for the arm 61 is shown in detail in FIGS. 6–8. The jaw control mechanism for arm 62 is the same.

The arm 61 is mounted on the upper end of the drive shaft 64 on an arm clamp 70 which is fastened to shaft 64 above a spacer ring 71. The arm 61 comprises two cooperating jaw portions 72 and 73 which are connected by a resilient U-shaped spring 74. The spring 74 is fastened at its end 75 to a collar 76 which is secured by bolt 77 to the arm clamp 70. A cam rod 78 slidably mounted in drive shaft 64 has a conical end 79 at its upper end which moves the jaw 66 from its open position as shown in dash-dot lines in FIG. 6 to its closed container gripping position as shown in solid lines. The conical cam surface 79 engages the beveled side portions 80 and 81 (FIG. 8) of the jaw portions 72 and 73 to move the jaw portions 72 and 73 apart against the force of spring 74 when the cam rod 78 is raised to the dash-dot position 79a of FIG. 8. A top plate 83 has a stop 83a positioned between the jaw members to limit the inner position of the jaws when no container is gripped. The ends 72a and 73a of jaws 72 and 73 are detachably connected by bolts 72b and 73b to allow for their replacement as required by the container shape.

The vertical positions of the cam rods 78 are controlled by rotating cams 82 (FIGS. 4 and 5), which are attached to the bottoms of the gears 72. Gears 72, which drive the rotating arms 61 and 62 through gear 73 and drive shaft 64, rotate once for every two rotations of the arms 61 and 62. Cutout portions 84 on the cams 82 allow the cam rod 78 to move to its lowermost position so that the jaws 66 and 67 close on a container 3. For the arm 61 the cutout portion 84 of the cam 82 is adjusted to close the jaw 66 between the arm positions 61a and 61b (FIG. 3) on every other rotation of arm 61 to move a container 3 from the conveyor 4 to the weighing platform 63. The beveled edges 85 on either side of the cutout portions 84 on cams 82 raise and lower the cam rods 78 to and from cam surfaces 86 to spread the jaws 67 and 68 to their open position. When the jaws 66 and 67 are in their open position, the arms 61 and 62 swing over the conveyor 4 and by a container 3 without engaging the container 3. A flywheel 87, mounted in bearings 88 on frame 30, is driven by turntable 35 through ring gear 89 and gear 89a to prevent fluctuations in the turntable speed due to the operation of the cams and the rotating arms.

In order to provide for the smooth operation of the weighing machine, it is preferable to replace each weighed container 3 on the conveyor 4 in the space left by the next container to be weighed. This is accomplished by arranging the relative positions of the turntable 35, the arm 62, and the conveyor 4, so that the distance traveled by a container 3 from its pick-off point at 61a (FIG. 3) around the turntable 35 to its replacement point 62c is equal to the distance between points 61a and 62c plus the distance between twelve containers 3. This follows from the fact that conveyor 4, arms 61 and 62, and scale platform 63 are all traveling at the same speed and that the container 3 and the point on conveyor 4 on which it will be replaced must each travel the same distance between the time the container 3 is removed from conveyor 4 and the time at which it is replaced at point 62c.

*The scale*

The scale 22 weighs each of the containers 3 placed on its weighing platform 63 and registers those which are either above or below a predetermined weight to control the operation of the automatic control circuit. Suitable scales for this purpose are available commercially and no claims are made herein to the scale, per se. The scale 22 has overweight and underweight relay contacts which are closed by overweight and underweight containers 3, respectively, to control the automatic regulator control circuit. The operation of a preferred embodiment of the scale in the control circuit will be explained in connection with FIG. 13, which is a schematic wiring diagram of the scale and its related connections.

Scale 22, which is mounted on turntable 35, has a balance arm 90 pivotally mounted at 91 intermediate its weighing platform 63 and a light shield 92. When a container 3 is positioned on the platform 63 from the conveyor 4, the balance arm 90 moves the light shield 92 to a position determined by the weight of the container 3 to provide an indication of the container weight, as will be more fully explained in connection with the scale sensing circuit shown at the left of FIG. 13.

The scale sensing circuit comprises an underweight relay circuit indicated generally at 94 and an overweight relay circuit indicated generally at 95.

*Scale operation for underweight containers*

The underweight relay circuit 94 comprises an underweight relay 96 having its solenoid 97 connected in the plate circuit of a thyratron tube 98 such as a GL2050 and a thyratron grid control circuit 99 connected to the control grid 100 of the thyratron 98. Plate voltage is applied to the thyratron 98 through solenoid 97 from secondary 101a of a power transformer 101. A time delay relay has its contacts 101c in the plate circuit and its operating solenoid 101d in the primary 101b of transformer 101. Contacts 101c close a predetermined time interval after the transformer 101 is energized to protect the thyratron from the premature application of plate voltage. When an underweight container 3 is on the balance arm 90, the shield 92 is at its position 92a blocking the light rays of lamp 108 from the photo cell 102 in grid control circuit 99. Photo cell 102, which is connected between the thyratron control grid 100 and ground, being dark, is non-conductive so that the thyratron control grid 100 which is connected to the tap 103 on the potential divider 104 is positive with respect to the thyratron cathode 105 on positive cycles of plate voltage when thyratron plate 106 is also positive, allowing the thyratron 98 to fire so that a pulsed D.C. current flowing through the solenoid 97 closes contacts 107 of the underweight relay 96. The closing of the contacts 107 operates the automatic weight regulator control to correct for the underweight condition, as will be more fully described below.

The overweight relay circuit 95 has elements similar to the underweight relay circuit 94 including an overweight relay 110 having a solenoid 111 connected in the plate circuit of the thyratron 112. Plate voltage is applied to the thyratron 112 through solenoid 111 from the transformer 101 through the protective time delay relay contacts 101c. The thyratron control circuit 114 for the thyratron 112 includes the control grid 113, which is connected to the potential divider 119 by tap 116, and the photo cell 115, which is connected between the tap 116 and ground. With an underweight container 3 on the scale 22, the shield 92 also covers the overweight photo cell 115. The darkened photo cell 115 is thus non-conducting also, and the grid 113 of the overweight thyratron 113 is biased positively by tap 116 when the thyratron plate 120 is also positive. Thyratron 112 thus fires on the positive voltage cycles so that normally closed contacts 118 of the overweight relay 110 are opened. Thus, when an underweight container 3 is placed on the scale 22, contacts 107 of the underweight relay 96 close and contacts 118 of the overweight relay 110 open. The connection of the contacts 118 and 107 of overweight and underweight relays 96 and 110 to the regulator control will be described below.

*Scale operation for normal weight containers*

When a container 3 having the desired weight is in position on scales 90, the light shield 92 is moved to the position indicated at 92b. In this position the underweight photo cell 102 is now exposed to the lamp 108 so that it conducts current and thus presents a relatively low resistance compared to grid resistor 104. The voltage on control grid 100 is reduced to the point where the thyratron 98 no longer fires on positive cycles of plate voltage and relay 96 opens to open the contacts 107. The overweight photo cell 115 remains dark, as was described for an underweight container, so that the thyratron 112 continues to fire, holding relay contacts 118 open. Thus, for a container 3 of the correct weight, neither of the relay contacts 107 and 118 are closed, so that no corrective action is taken by the automatic weight control circuit. The exact weight at which the relay contacts 107 open is adjusted by moving center tap 103 or by moving the position of photo cell 102.

Scale operation for overweight containers

When an overweight container 3 is placed on the scale 22, the shield 92 is moved to the position indicated at 92c. Light from lamp 108 now strikes both photo cells 102 and 115. Contacts 107 remain open, as was described for the normal weight container. Photo cell 115 is also now conductive so that the potential of grid 113 of the overweight thyratron 112 is lowered below the cut-off point for positive voltage cycles in the same manner as described for grid 100 of thyratron 98. The current through the solenoid 111 is cut off, allowing the normally closed overweight relay contacts 118 to close. The closing of contacts 118 initiates a weight-correcting action in the automatic regulator control circuit, as will also be more fully described. The exact weight at which the overweight contacts 118 close is adjusted by moving center tap 116 or by adjusting the position of photo cell 115.

Electrical connections between the scale which is rotated in the turntable 35 and the elements fixedly mounted on the frame 30 of the automatic weighing machine 21 are made through collector rings 121—125 on the turntable shaft 36. The primary of the power transformer 101 is connected through collector rings 122 and 123, brushes 122a and 123a, and terminals 122b and 123b to a suitable A.C. voltage source which is preferably regulated to protect the operation of the scale circuit from source voltage variations.

The voltage applied to the automatic regulator control circuit through contact 107 of the underweight relay 96 or contact 118 of the overweight relay 110 is applied to the scale from collector ring 121 through a no-load limit switch 109. The no-load limit switch 109 is connected between the collector ring 121 and the contacts 107 and 118, and it is operated by the balance arm 90 of the scale 22 so that it is closed only when a container 3 is positioned on the scale 22. This prevents an underweight indication when no container is on the scale which otherwise would occur when the container formation is interrupted. An additional limit switch 126 is also provided in series with the voltage source for the contacts 107 and 118 between terminal 128 on the automatic weighing machine and brush 121a for collector ring 121. Limit switch 126 has a contact arm 126a in engagement with a circular cam 129 on the turntable 35. Cam 129 is shaped so that it closes switch 126 for a predetermined period while the containers 3 are being moved along a portion of their path between the points where they are placed on and removed from the scale 22. This limits the operation of the scale sensing circuit to a period intermediate the application and removal points of the container 3 to and from the scale 22, which allows the scale 22 to reach equilibrium before readings are taken.

Automatic regulator control circuit

A schematic wiring diagram of the automatic regulator control circuit is illustrated in FIG. 14. The general operation of the circuit will first be described, including the function of the principal elements, and then a detailed description of the control circuit will be given, including the various protective elements.

The function of the regulator control circuit is to run the regulator motor 24 of the regulator drive system for a predetermined time in the proper direction to compensate for either overweight or underweight glass charges by changing the position of the control tube 11 or any other regulator means in the glass feeder 2.

Operation for underweight containers

As described above in connection with FIG. 13, the placing of an underweight container 3 on the scale 22 closes the contacts 107 of the underweight relay 96 of the scale 22, which connects solenoid 130 of underweight relay 131 to one side of the voltage supply transformer 163, through line 125c, terminal 125b, brush 125a, collector ring 125, contacts 107, switches 109 and 126, terminal 128, switch 128a, and line 161 (FIG. 14). Solenoid 130 is connected at its other end to the other output terminal of transformer 163 by line 162 so that it is energized by transformer 163 by the closing of contact 107 to close the underweight relay contacts 132—134. The contact 132 is connected in series with the advancing coil 135 of the underweight stepping relay 136 and when it is closed, it connects the coil 135 across the output lines 161 and 162 of power transformer 163 through normally closed relay contacts 175, 178, and 179, whose function will be described below. Thus, each time that the scale 22 registers an underweight container 3, underweight relay 130 is closed, thereby advancing stepping relay 136 one step. The stepping relay 136 has each of its contacts 136a connected to corresponding contacts 137a on selector switch 137. Contact arm 137b on the selector switch 137 adjustably connects one contact 137a to the power line 161. A selector switch having five contacts 137a is shown in FIG. 14. More or less contacts may be provided as desired to give different stepping ranges. After the stepping relay 136 has stepped to the pre-set position of the selector switch 137, which is shown as four steps in FIG. 14, the solenoid 138 of the underweight control relay 139 is connected across the voltage lines 161 and 162 through selector switch arm 137b, contact 137a, stepping relay contact 136a, and contact arm 136b. The contacts 140 of the underweight control relay 139 are closed, connecting the solenoid 141 of the underweight motor control relay 142 across the voltage lines 161 and 162, through normally closed contact 241a of underweight limit switch 241. Contacts 144 of motor control relay 142 close to energize the drive motor 24 from three-phase voltage source 143 so that it turns in a direction to raise control tube 11 to increase the size of the molten glass charge being fed from glass feeder 2.

A locking circuit is provided in the automatic regulator control circuit to cause the motor 24 to run for an adjustable and a predetermined time interval after the motor 24 has been energized by the closing of the underweight control relay 139 and the motor control relay 142. The locking circuit comprises contacts 145 on the underweight control relay 139 and time delay opening relay 146 having contacts 147 which operate in the following manner.

After an underweight signal from the scale 22 has closed the underweight control relay 139, as described above, its contacts 148 energize the resetting coil 149 of the stepping relay 136 by connecting coil 149 between voltage lines 161 and 162 through the normally closed contacts 175 of time delay relay 150. This causes the stepping relay 136 to return to its original open starting position. Simultaneously, holding contacts 145 on the underweight control relay 139 maintain the voltage connection for solenoid 138 across the voltage lines 161 and 162 through the normally closed contacts 147, 182, and 185. The time delay opening relay 146 has its operating coil connected across voltage lines 161 and 162 through contacts 151 on the motor control relay 142 so that its opening action is commenced when the motor 24 is energized and so that its contacts 147 will open a predetermined time thereafter. When the contacts 147 are opened, coil 138 of the underweight control relay 139 is de-energized, causing the relay 139 and the interconnected motor control relay 142 to open. Opening of the relay 142 stops the drive motor 24. Time delay relay 146 is an automatic resetting relay which recloses contacts 147 after they are opened and is preferably an adjustable relay so that the time which it takes to open may be adjusted as desired to obtain the optimum running time for the motor 24 in effecting correction of the size of the glass feeder charge.

*Operation for overweight containers*

A similar circuit to the above-described underweight circuit is provided in the automatic regulator control circuit to provide corrections for overweight containers. As described above in connection with FIG. 13, the positioning of an overweight container 3 on the scale 22 closes the relay contacts 118 in the scale circuit. Contacts 118 similarly apply voltage from voltage lines 161 and 162 to the solenoid 154 of the overweight relay 155 through collector ring 124, brush 124a, terminal 124b, and line 124c. Each closing of the overweight relay 155 closes its contacts 156 and steps the overweight stepping relay 157 one step through the energization of its stepping coil 158. The overweight stepping relay 157 is connected in parallel with the underweight stepping relay 136 so that a predetermined number of steps as set by the selector switch arm 137b energizes the coil 158 of the overweight control relay 159 from voltage lines 161 and 162. The contacts 165 of the overweight control relay 159 close the overweight motor control relay 166 by energizing its coil 167 through the normally closed contacts 242a of overweight limit switch 242. A holding circuit similar to the above-described underweight holding circuit runs the motor 24 for a predetermined time period as motor 24 lowers the control tube 11 to decrease the size of the glass charge being fed by the glass feeder 2. The holding circuit comprises contacts 168 of the overweight control relay 159 which energize the reset coil 169 of the overweight stepping relay 157 to return it to its starting position and locking contacts 170 of the overweight control relay 159 which close to keep the relay solenoid 158 energized through normally closed contacts 147, 182, and 185. The time delay relay 146 operating coil is connected across voltage lines 161 and 162 through contacts 171 of the motor control relay 166, causing the contacts 147 of the time delay opening relay 146 to open a predetermined time interval after the starting of the motor 24 so that the overweight control relay 159 and its interconnected overweight motor control relay 166 are opened to stop the regulator motor 24.

The automatic regulator control circuit corrects for significant variations in the size of the glass charges being fed by the glass feeder 2. Changes in the size of the glass charges are caused mainly by changes in the viscosity of the molten glass due to temperature changes in the glass furnace or due to changes in the materials of the raw batch being fed into the glass melting furnace. These changes normally occur in a progressive manner, and it is therefore desirable that the automatic regulator control circuit be operated for progressive or continuous changes in the container weight and that it be inoperative for random changes where the containers may periodically alternate in a random manner above and below the desired weight. For this reason, the above-described stepping relays have been included in the circuit so that the corrective action is initiated only after an adjustable and predetermined number of overweight or underweight containers have been sensed. In addition, the circuit provides for corrective action only for successive numbers. Thus, for example, where the selector switch 137 is set to count four containers, as in FIG. 14, the circuit is only operative when four containers have been counted as being underweight without the sensing of an overweight container or where four containers have been counted as being overweight without the sensing of an underweight container. This operation is provided for by connecting contact 134 of the underweight relay 131 in parallel with the resetting contact 168 of the overweight control relay 159. Each time that an underweight container 3 is sensed by the scales 22, the closing of the underweight relay 131 resets the overweight stepping relay 157 in addition to its regular function of stepping the underweight stepping relay 136. Therefore, the sensing of an underweight container will always reset the overweight stepping relay 157 even though the overweight stepping relay 157 has previously counted three successive overweight containers. Similarly, contacts 174 on the overweight relay 155 are connected in parallel with resetting contacts 148 on the underweight control relay 139 to reset the underweight stepping relay 136 whenever an overweight container 3 is sensed on the scale 22.

In order to prevent damage to the stepping and resetting coils 135 and 149 of the underweight stepping relay 136 and to the stepping and resetting solenoids 158 and 169 of the overweight stepping relay 157, each of these solenoids is connected to its energizing voltage source through contacts 175 of time delay opening relay 150. The operating coil for the time delay relay 150 is connected at one side to voltage wire 162 and at its other side to the voltage wire 161 through a series combination of contacts 133 on the underweight relay and 176 on the overweight relay connected in parallel and normally closed contacts 178 and 179. When either the underweight relay 131 or the overweight relay 155 closes to energize the stepping relay 136 and 157, respectively, the opening action of the time delay 150 will commence by the closing of contacts 133 or 176 so that its contacts 175 will open a predetermined time interval thereafter to automatically remove the voltage from the solenoids of the stepping relays to prevent their damage by overheating. Time opening delay relay 150 is an automatic resetting relay which resets itself to close contacts 175 after they open.

Once the regulator motor 24 has been energized by the closing of control relay 139 or 159, the circuit is made insensitive to additional overweight or underweight signals from the scale 22 by having the solenoids 135 and 158 of the stepping relays 136 and 157, respectively, connected to the voltage line 161 through a series connection or normally closed contacts 177 on the underweight control relay 139 and 178 on the overweight control relay 159. The closing of either the overweight or the underweight control relay to energize regulator motor 24 opens the contact 177 or the contact 178 to prevent the application of voltage to either of the stepping relays 156 or 157 so that their stepping action cannot be resumed until the control relays open when the regulator motor reaches the end of its correction run.

In order to provide for manual correction for underweight containers, the solenoid 138 of the underweight control relay 139 is connected to the power line 161 through an underweight switch 179. Switch 179 is mounted on a suitable control station 180 (FIG. 4). The closing of the contacts 181 of the underweight switch 179 closes the underweight control relay 139 and interconnected motor control relay 142 to turn the regulator motor 24 in the proper direction to raise the control tube 11 to increase the size of the glass charge. Normally closed contacts 182 are provided on the switch 179 which are connected in series with the holding contacts 147 of the underweight control relay so that the automatic timing circuit controlled by the time delay relay 146 is made inoperative while the regulator motor 24 is being operated by the manual underweight switch 179. A similar manual overweight switch 184 connects the voltage line 161 to the solenoid 158 of the overweight control relay 159 through contacts 183 to provide for downward adjustment of the control tube 11 in a similar manner. A switch 128a is also mounted on control station 180 to disconnect the scale relay contacts 107 and 118 while manual adjustments are made.

In order to provide a visual indication for the operator of the container making machine, indicator lights are connected across the various relay solenoids to show when the relays are operating to adjust the weight of the charge. Lamps 186 and 187 are connected across the solenoids of the underweight and overweight relays, respectively, to indicate the sensing by the scale 22 of overweight or underweight containers. Flashing of the indicator lamps 186 and 187, therefore, gives the operator an indication of the numbers of containers which are being formed above and below the desired weight. Lamps 188 and 189 are connected across the solenoids 138 and 158 of the underweight and overweight control relays, respectively. The ignition of one of these lamps indicates that the regulator motor 24 is being driven to make a correction in the charge being supplied by the glass feeder 2. A lamp 190 connected across the secondary power transformer 163 indicates that both the main switch 143 and the power switch 191 have been closed to operate the automatic regulator control circuit. Lamps 186—190 are mounted on the control station 180 adjacent to the control switches 128a, 179, and 184.

*Regulator drive system*

The regulator drive system is illustrated in FIGS. 10-12. The regulator drive system comprises the regulator motor 24, which is mounted on a suitable base plate 200 adjacent to the glass feeder 2. As described above, the regulator motor 24 is controlled by the automatic regulator control circuit so that it rotates for predetermined periods in opposite directions to increase or decrease the weight of the charge being supplied by the glass feeder 2 to the article forming machine 1. The size of the charge fed by the glass feeder 2 is determined by the vertical position of the control tube 11 adjacent to the feeder orifice 7 (FIG. 1). The regulator motor 24 is operatively connected to the threaded shaft 14 which positions the control tube 11 by a connector system 201. The connector system 201 comprises a shaft 202 having upper shaft portion 204, which is connected at its upper end with the threaded control tube support shaft 14 by universal joint 205. The lower end of the shaft portion 204 is connected through a universal joint 206 to a lower shaft portion 107. The lower shaft portion 207 is mounted in a suitable bearing 208 in the base plate 200, and it is rotated in the bearing 208 by the regulator motor 24 through the intermediation of pinion 209 on the motor shaft 210 and gear 211 on shaft portion 207. Rotation of the shaft 202 in one direction by the regulator motor 24 rotates the threaded shaft 14 to raise the control tube on the support 12, and rotation of the shaft 202 by the motor 24 in the opposite direction correspondingly rotates the shaft 14 in the opposite direction to lower the control tube 11. The lower portion 107 of the shaft 202 is detachably connected to the gear 211 to allow for hand rotation of the shaft 202 by the handle 215. The detachable connection between the gear 211 and the shaft portion 207 comprises interlocking teeth 216 and 217 on the upper portion of the hub 218 of gear 211 and the lower face of a collar 219 on shaft portion 207, respectively. Collar 219 is fixedly attached to portion 207 by pin 220. When the shaft is in its normal position, the teeth 216 and 217 are interlocked through the weight of the shaft 202 so that the shaft 202 is driven by the regulator motor 24. When it is desired to adjust the control tube 11 manually, the lower portion 207 of the shaft 202 is raised so that teeth 216 and 217 are disengaged. Vertical movement of the handle 215 and collar 219 to disengage the teeth 216 and 217 is provided by coupling 212. Pin 213 fits in elongated slot 214 to allow the telescoped portions 212a and 212b of coupling 212 to slide axially together. The shaft 202 may then be turned manually by handle 215 independently of the regulator motor 24.

In order to prevent damage to the glass feeder 2 by overdriving the control tube 11 in either an upward or downward direction, a control tube position limit control 230 is provided on the regulator drive system. The limit control 230 is mounted adjacent to the regulator motor 24, and it comprises a shaft 231 rotatably mounted on the base plate 200 in bearings 232 and driven by means of a gear 234 which engages gear 211 on the shaft 202. A center portion 233 of the shaft 231 has its upper end threaded, and it mounts a threaded actuator nut 235 thereon. The threaded actuator nut 235 has slots 237 and 238 on opposite sides which engage vertical guide members 239 and 240. Rotation of the shaft 231 raises or lowers the threaded actuator nut 235 a distance proportionate to the number of turns which the regulator motor 24 moves the regulator shaft 202. Mounted above and below the threaded actuator nut 235 on guide plate 240 are upper and lower limit switches 241 and 242, respectively, which deactivate the automatic control circuit and which give a warning signal when they are operated by the actuator nut 235, as will be explained in connection with the wiring diagram 14.

The limit switches 241 and 242 have normally closed contacts 241a and 242a which are opened when the switches are contacted by the threaded actuator nut 235. Contacts 241b and 242b are connected in series with the solenoids 141 and 167 of the underweight and the overweight motor control relays, respectively, so that their opening opens their associated relays to stop the regulator motor 24. Normally open contacts 241b and 242b on the limit switches 241 and 242 are connected in parallel between a warning lamp 256 and voltage wire 161. When actuator nut 235 is moved to its extreme upper or lower position, where it engages the upper limit switch 241 or the lower limit switch 242, respectively, the closing of the switch contacts 241b or 242b will energize the lamp to warn the operator that the control tube 11 has been moved beyond its desired range. In order to provide for the adjustment of the position of the actuator nut 235 on the shaft 231, an adjustable connection 249 is provided for center portion 233. Adjustable connection 249 permits the center portion 233 to be rotated within the collar portion 248 so that the threaded actuator nut 235 may be raised or lowered to a desired position independently of the position of the motor 24 or the connector system 201. The adjustable connection 249 comprises a worm gear 250 fixedly attached to the center portion 233 and a worm 251 rotatably mounted on a bracket 252 on the collar portion 248. Rotation of the worm 251 by handle 254 rotates the worm gear 250 and its attached center shaft portion 233 with respect to the collar portion 248 as well as the connector system 201 and the regulator motor 24.

*Operation*

The operation of the automatic weight regulator, which has been described in detail above, will now be summarized.

Glass charges 8 are intermittently supplied to the forming machine 1 by the glass feeder 2. The glass charges 8 pass into the forming machine 1 where they are molded or otherwise formed into containers 3. Containers 3 are continuously discharged from the forming machine 1 onto the horizontal conveyor 4, which carries the containers 3 to a further processing point such as an annealing furnace (not shown). As the containers 3 are moved horizontally by the conveyor 4, they are carried past the spotter 15 mounted adjacent to the conveyor 4. The spotter star wheel 16 positions the containers 3 in a predetermined position on conveyor 4 with respect to the turntable 35 and arms 61 and 62 on the automatic weighing machine 21 which is driven in synchronism with the spotter 15. The automatic weighing machine 21 is positioned adjacent to the conveyor 4 beyond the spotter 15. Rotating arm 61 on the automatic weighing machine 21 engages every twelfth container on the conveyor 4 and moves it to the weighing platform 63 of the scale 22. Scale 22 is mounted on the rotating turntable 35 of the automatic weighing machine 21, and the container 3 which has been placed on the scale by the arm 61 is carried in a semicircular path to a point adjacent a second rotating arm 62. Arm 62 engages the container 3 on the scale platform 63 and moves it back to the conveyor 4 so that it occupies the position vacated by the next container 3 simultaneously being positioned onto scale 22.

While each container 3 is on the weighing platform 63, scale 22 operates in the following manner to provide an indication of whether the particular container 3 is of a predetermined weight or if it is above or below the predetermined weight. If the container is the predetermined weight, no correction of the glass feeder charge is necessary and the automatic regulator control circuit remains inoperative. If the container 3 is either overweight or underweight, an overweight or underweight relay, respectively, is closed to relay this information to the automatic regulator control circuit. A counting device is provided in the automatic regulator control circuit which can be set to count a predetermined number of successive overweight or underweight containers. When the predetermined number has been reached, the automatic regulator control circuit energizes the regulator control motor 24 so that the control tube 11 is raised or lowered in the glass feeder 2 to change the size of the glass charge in the appropriate direction to correct for the drift in the container weight. As more fully described above, the counting circuit of the automatic regulator control only counts off-weight containers 3 which are successively overweight or successively underweight.

It will be seen that the present invention provides an improved automatic weight regulator which is adaptable for use with a wide variety of glass forming machines and which is also adaptable for use with glass forming machines which operate at high speeds. The automatic weight regulator of the present invention is stable in operation and is designed to be inoperative for random variations in the article weight which do not indicate a definite trend or drift in the operation of the glass forming machinery. The automatic weight regulator is reliable and is adapted for use with a minimum of attendance by the inclusion of numerous automatic safeguards which minimize the chances of faulty operation. Greater uniformity in weight is attained and less labor is required to make the glassware, thus providing better glassware at a lower cost.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An automatic glass forming machine comprising the combination of a glass feeder, feed correction means for selectively raising and lowering the weight of the charges delivered by said glass feeder, a glass article forming means adjacent said glass feeder and operatively coupled thereto to mold charges therefrom into glass articles, a conveyor to convey continuously the molded articles from said forming means, weighing means adjacent said conveyor, transfer means to move glass articles to said weighing means, article sensing means connected to said weighing means to selectively sense glass articles which are over or under a predetermined weight, overweight counting means connected to said article sensing means to count the number of overweight articles sensed thereby, underweight counting means connected to said article sensing means to count the number of underweight articles sensed thereby, first control means connected between said overweight counting means and said feed correction means for lowering the charge weight a predetermined amount when the overweight counting means reaches a set count, and second control means connected between said underweight counting means and said feed correction means for raising the charge weight a predetermined amount when the underweight counting means reaches a set count.

2. The automatic glass forming machine as claimed in claim 1 which further comprises first reset means in circuit with the article sensing means to reset the overweight counting means when an underweight article is sensed by the article sensing means and second reset means in circuit with the article sensing means to reset the underweight counting means when an overweight article is sensed by the article sensing means.

3. The automatic glass forming machine as claimed in claim 1 in which said weighing means comprises a turntable adjacent to said conveyor belt and operatively connected thereto whereby said conveyor and said table move in synchronism and a scale means positioned on said turntable and spaced from its center so that it is moved at the speed of said conveyor belt.

4. The automatic glass forming means as claimed in claim 3 in which said transfer means comprises first and second rotatably mounted pick-off arms having article gripping jaws at their extremities, one of said arms being positioned to move articles from the conveyor to the scale and the other of said arms being positioned to move articles from the scale to the conveyor, said arms being operatively connected to said turntable whereby the article gripping jaws move at the same speed as the conveyor and the scale and whereby the weighed articles move continuously at a constant velocity.

5. In combination a glass feeder, an automatic regulator for the glass feeder having a reversible electric drive motor adapted to increase the charge weight when driven in one direction and to decrease the charge weight when driven in the other direction, an article forming means adjacent said glass feeder and adapted to form glass articles from the glass charges, a conveyor running from said forming means to carry articles therefrom, a sensing and automatic control means for said regulator motor comprising the combination of a scale adapted to weigh glass articles formed from glass charges from said feeder, a transfer means at said conveyor and adapted to transfer glass articles to said scale, an underweight sensing relay operable responsive to underweight articles on said scale and an overweight sensing relay operable responsive to overweight articles on said scale, a pair of stepping relays each having a reset coil and each connected to a set of contacts on one of said sensing relays and each adapted to be stepped one step each time its connected sensing relay is operated by said scale, a pair of control relays each connected to one of the set of the step contacts on one of said stepping relays whereby each of said control relays is operated after its connected stepping relay is stepped to said one set of step contacts, a pair of motor control relays each connected to a set of contacts on one of said control relays, a set of contacts on each sensing relay connected to the reset coil on the stepping relay connected to the other sensing relay whereby the operation of one sensing relay resets the stepping relay associated with the other sensing relay, and said motor control relays adapted to energize said drive motor to rotate it in opposite directions when operated by said control relays.

6. The combination as claimed in claim 5 which further comprises a timing means in circuit with said pair of control relays for opening the respective relay a predetermined period of time after it closes to thereby de-energize said drive motor.

7. In combination a glass feeder, an automatic regulator for the glass feeder having a reversible electric drive motor adapted to increase the charge weight when driven in one direction and to decreaes the charge weight when driven in the other direction, an article forming means adjacent said glass feeder and adapted to form glass articles from the glass charges, a conveyor running from said forming means to carry glass articles therefrom, a sensing and automatic control means for said regulator motor comprising the combination of a scale adapted to weigh glass articles formed from glass charges from said feeder, a transfer means at said conveyor and adapted to transfer glass articles to said scale, an underweight relay operable responsive to underweight articles on said scale, an underweight stepping relay having a set of step contacts and being connected to a pair of contacts of said underweight for movement one step each time said underweight relay closes, an underweight control relay connected to one of the set of step contacts, an underweight motor control relay connected to a pair of contacts on said underweight control relay and adapted to energize said drive motor to rotate it in said one direction whereby the weighing of a predetermined number of underweight glass articles increases the charge weight, an overweight relay operable responsive to overweight articles on said scale, an overweight stepping relay having a set of step contacts and being connected to a pair of contacts of said overweight relay for movement one step each time said overweight relay closes, an overweight control relay connected to one of the set of step contacts on said overweight stepping relay, an overweight motor control relay connected to a pair of contacts on said overweight control relay and adapted to energize said drive motor to rotate in said other direction whereby a predetermined number of overweight glass articles decreases the charge weight, and a timing means in circuit with said underweight and overweight control relays for opening the respective relay a predetermined period of time after it closes to de-energize said drive motor.

8. The invention as claimed in claim 7 which further comprises a reset coil on said underweight stepping relay in circuit with said overweight relay whereby the underweight stepping relay is reset each time that the overweight relay operates, and a reset coil on the overweight stepping relay in circuit with said underweight relay whereby the overweight stepping relay is reset each time that the underweight relay operates.

References Cited in the file of this patent

UNITED STATES PATENTS

| | | |
|---|---|---|
| 933,356 | Hore | June 1, 1909 |
| 1,617,301 | Redick et al. | Feb. 8, 1927 |
| 1,619,729 | Howard | Mar. 1, 1927 |
| 2,013,451 | Stewart | Sept. 3, 1935 |
| 2,153,922 | Green et al. | Apr. 11, 1939 |
| 2,288,381 | Wood | June 30, 1942 |
| 2,293,860 | Sloan | Aug. 25, 1942 |
| 2,306,789 | McNamara | Dec. 29, 1942 |